United States Patent
Wu et al.

(10) Patent No.: US 9,336,316 B2
(45) Date of Patent: May 10, 2016

(54) IMAGE URL-BASED JUNK DETECTION

(71) Applicant: Microsoft Corporation, Redmond, WA (US)

(72) Inventors: Zhong Wu, Issaquah, WA (US); Xian-Sheng Hua, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 13/669,425

(22) Filed: Nov. 5, 2012

(65) Prior Publication Data
US 2014/0129490 A1    May 8, 2014

(51) Int. Cl.
*G06N 5/02* (2006.01)
*G06F 17/30* (2006.01)

(52) U.S. Cl.
CPC ............ *G06F 17/30867* (2013.01); *G06N 5/02* (2013.01); *G06N 5/025* (2013.01)

(58) Field of Classification Search
None
See application file for complete search history.

(56) References Cited

U.S. PATENT DOCUMENTS

| 6,161,130 A | 12/2000 | Horvitz et al. |
| 2012/0163709 A1 | 6/2012 | Barros et al. |

OTHER PUBLICATIONS

Ibrahim, Detecting and Preventing the Electronic Transmission of Illicit Images, Master's Thesis, University of Ontario Institute of Technology, 2009, pp. 1-102.*

Gao et al., "An Interactive Approach for Filtering Out Junk Images from Keyword-Based Google Search Results", IEEE Transactions on Circuits and Systems for Video Technology, Dec. 12, 2009, pp. 1851-1865, vol. 19, No. 12.

"Web Image Collector 2.13", retrieved at: http://www.macupdate.com/app/mac/22721/web-image-collector, last accessed Aug. 14, 2012, 2 pages.

Yan et al., "A Novel Algorithm for Filtering Out Junk Images Interactively from Web Ssearch Results", 3rd IEEE International Conference on Computer Science and Information Technology (ICCSIT), Jul. 9, 2010, pp. 195-199.

Gao et al., "A Comprehensive Approach to Image Spam Detection From Server to Client Solution", IEEE Transactions on Information Forensics and Security, Dec. 2010, pp. 826-836 pages, vol. 5, No. 4.

Bo et al., "Mixture Feature Based Junk Image Filtering", International Conference on Computer Distributed Control and Intelligent Environmental Monitoring (CDCIEM), Mar. 5, 2012, pp. 411-414.

Gao et al., "Google Image Visualization and Filtering", retrieved at: http://coitweb.uncc.edu/~jfan/google_demo/readme.htm, last accessed Aug. 14, 2012, 4 pages.

* cited by examiner

*Primary Examiner* — Wilbert L Starks
(74) *Attorney, Agent, or Firm* — David Ream; Douglas Barker; Micky Minhas

(57) ABSTRACT

Architecture that includes a junk (unwanted) image detection algorithm which performs junk image detection of unwanted images before the images are actually downloaded for indexing. Features are employed related to image location information and host websites, such as image path descriptor (e.g., URL-uniform resource locator) pattern features, webpage content features, click features, and image aggregated information in a machine learning based framework to predict the probability that an image is unwanted (or wanted) before the images are downloaded. The framework is then applied to build a statistical model and predict junk scores. By removing image URLs marked as "junk" from the work list of an automated indexer (e.g., crawler), the indexer bandwidth is significantly improved with a corresponding improvement in the publish rate.

20 Claims, 10 Drawing Sheets

IMAGE URL-BASED JUNK DETECTION

BACKGROUND

There is an increasing amount of images appearing on the web; however, a large amount of images are small or low-quality images. Due to the backend index generation and serving capacity limitations, it is not feasible to maintain all the images in the index. In one current implementation, only images with dimensions larger than a predetermined number of pixels are indexed. Images with dimensions (e.g., width, height) smaller than the pixel count are classified as "junk" images and filtered out while building the index. Existing multimedia backend crawlers crawl and process millions of images per day, of which a lesser, but yet significant number of images are "junk" images. A dilemma is that the image dimensions can only be known after the image is downloaded. Thus, much of the crawler bandwidth is wasted to download and process the junk images, which are to be eventually discarded.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a junk (unwanted) image detection algorithm that performs junk image detection of unwanted images before the images would otherwise be downloaded for indexing. The architecture uses features related to image location information and host websites, such as image path descriptor (e.g., URL-uniform resource locator) pattern features, webpage content features, click features, site modeling, and image aggregated information in a machine learning based framework to predict the probability that an image is unwanted (or wanted).

The framework builds a statistical model and predicts junk scores. By removing image URLs marked as "junk" from the work list of an automated indexer (e.g., crawler), the indexer bandwidth is significantly improved with a corresponding improvement in the publish rate.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
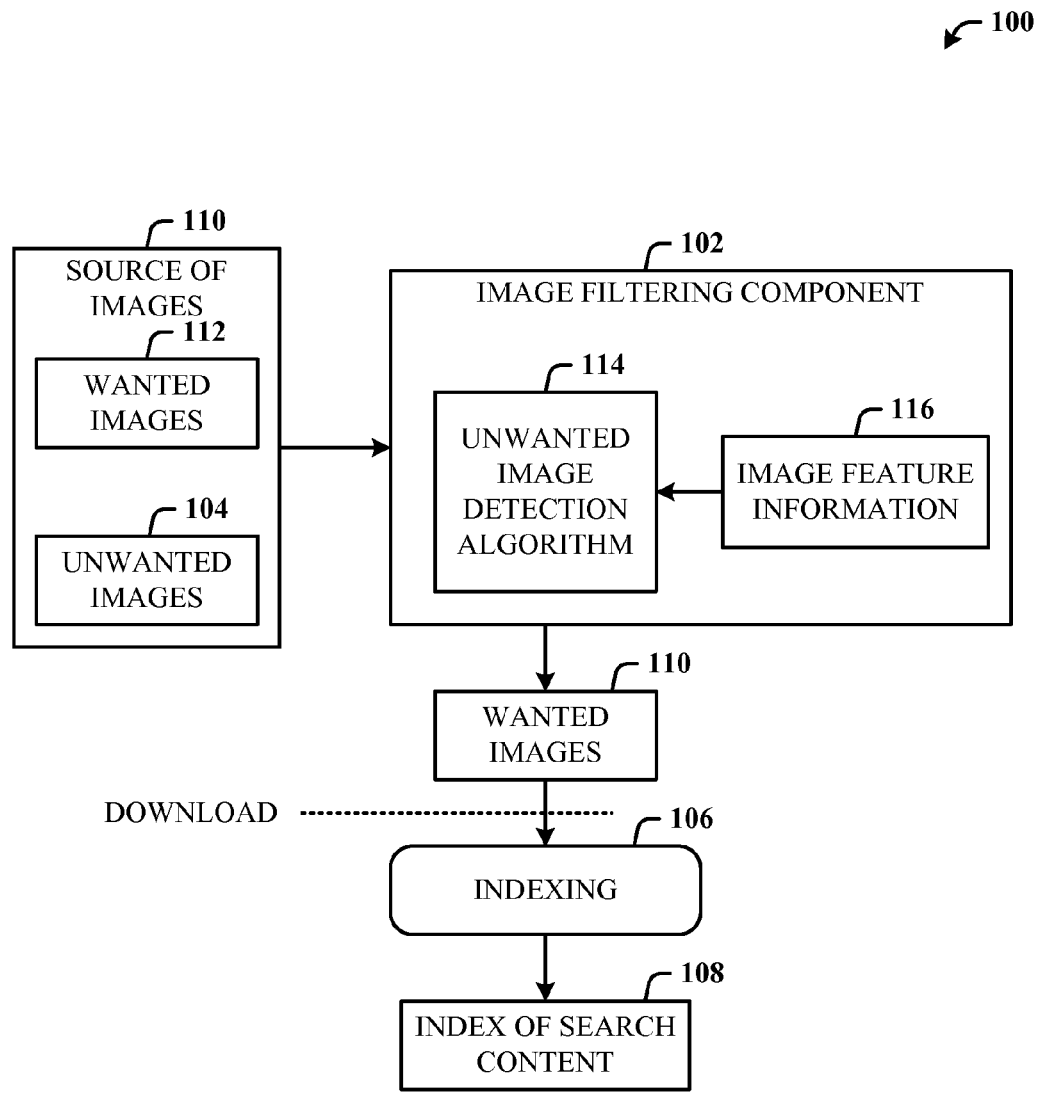
FIG. 1 illustrates a system of URL-based unwanted image detection in accordance with the disclosed architecture.

The disclosed architecture includes an image junk detection algorithm based on image location descriptors such as URLs (uniform resource locators). The junk detection algorithm is performed before the image is actually downloaded, and URL pattern features, page content features, click features and image URL aggregated features, to name just a few, in a machine learning framework that predicts the probability that an image URL is junk (or not). Site modeling is also employed as a feature.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 of URL-based unwanted (junk) image detection in accordance with the disclosed architecture. The system 100 include an image filtering component 102 that detects and removes unwanted images 104 from download as part of an index (indexing 106) of search content 108. The unwanted images 104 are part of a source 110 of images that includes the unwanted images 104 and wanted images 112. The unwanted images 104 are detected based on a detection algorithm 114 that predicts that an image is unwanted based on image feature information 116.

As described in detail herein below, the unwanted images 104 are detected based on a selection model trained using image feature information 116 that includes image URL (uniform resource locator) patterns, image page content, and image search click logs. The unwanted images 104 are removed from download based on removal from a work list of an automated indexer (as part of the indexing 106). The removal saves indexer bandwidth and improves an index publish rate.

The image filtering component 102 involves a training stage that learns a statistical selection model based on image feature information 116 derived from image URLs and image page URLs, involves a training stage that learns a statistical selection model based on image feature information 116 related to an aggregation feature derived from a multimedia repository, and involves a training stage that learns a statistical selection model based on image feature information 116 related to file extension type.

The image filtering component 102 also involves a training stage that learns a statistical selection model based on image feature information 116 related to a site modeling feature computed from URL patterns learned within a host and estimate image distribution for the host, and includes a machine learning component that builds a statistical unwanted image selection model to predict scores for the unwanted images 104.

Figure 2:
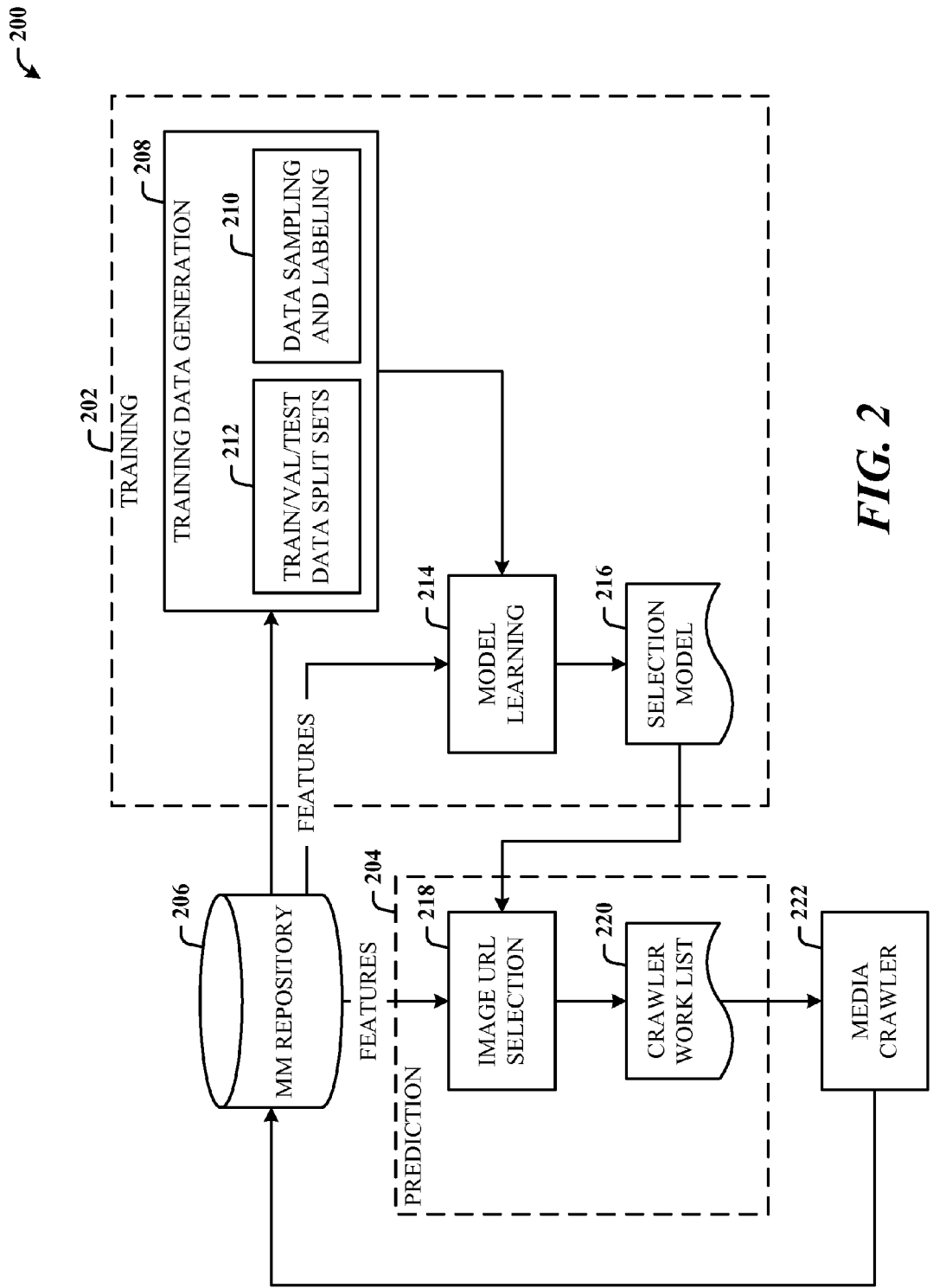
FIG. 2 illustrates an alternative system of URL-based unwanted image detection.

FIG. 2 illustrates an alternative system 200 of URL-based unwanted (junk) image detection. The system 200 depicts a training stage 202 and a prediction stage 204. These stages (202 and 204) are based on the centralized virtual cluster, dented as a multimedia (MM) repository (the repository 206), which stores the discovered image URLs, image page URLs, and other related information. (Although described in terms of URLs, it is to be understood that the architecture applies equally to other location descriptor implementations that, for example, can employ such as data pointers.)

In the training stage, according to the image processing history, training data generation 208 includes data sampling and labeling 210 for sampling image URLS from the repository 206 and dividing the samples into training/validation/test sets 212. A model learning algorithm 214 extracts features from the repository 206 and also receives the labeled data split sets 212 from training data generation 208. In this specific implementation, the model learning algorithm 214 employs a MART (multiple adaptive regression trees) learning algorithm to train a junk selection model 216. In the prediction stage 204, the pre-trained junk selection model 216 is applied to all image URLs of the repository 206 for image URL selection 218. Images labeled with "junk" (or a similar tag) are filtered out from a crawler work list 220. A media crawler (indexer) 222 then crawls the repository 206 to download wanted images for indexing.

Figure 3:
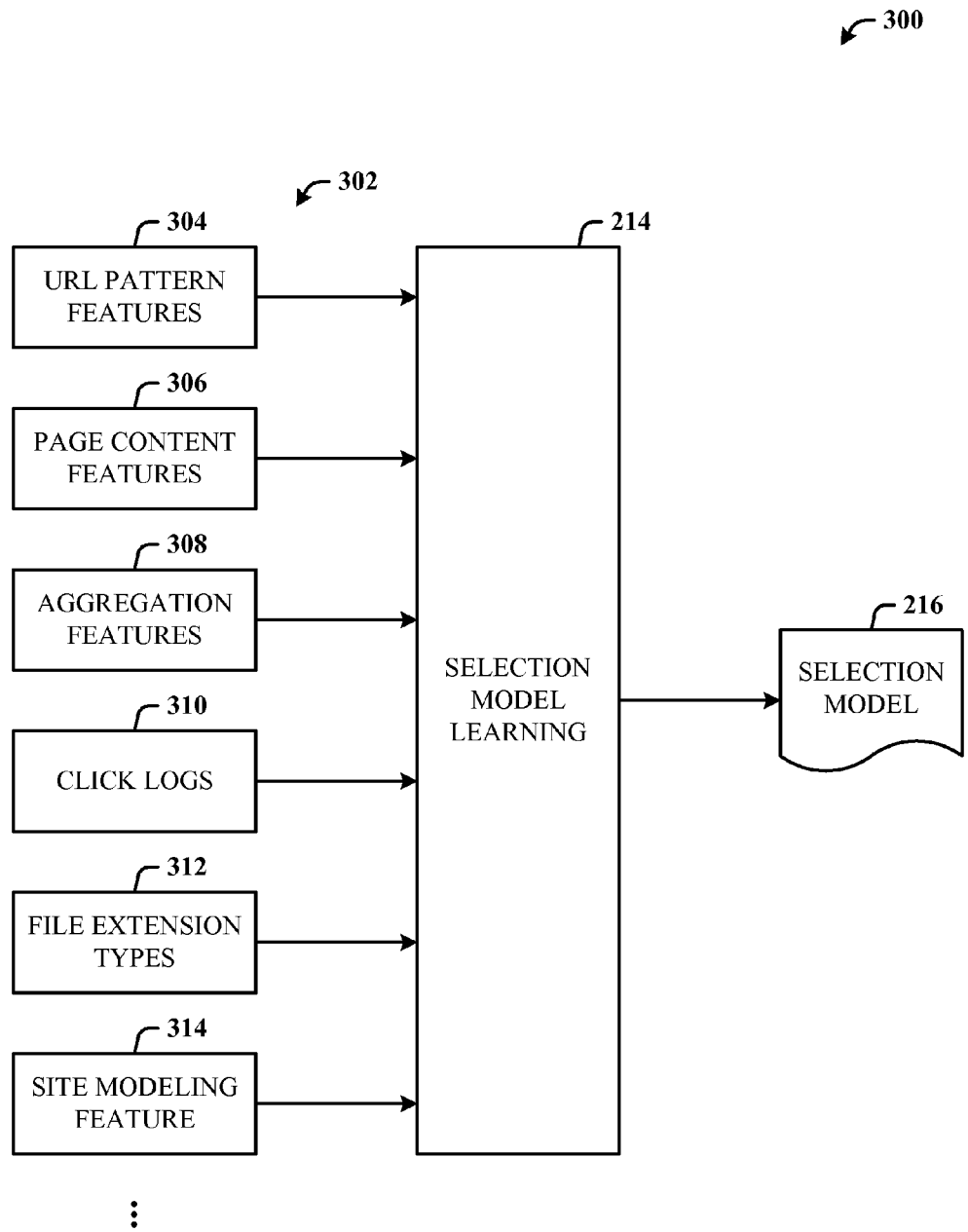
FIG. 3 illustrates a system of features for model selection learning of the selection model.

FIG. 3 illustrates a system 300 of features 302 for model selection learning of the selection model 216. In the crawling life-cycle, junk image detection occurs after the image pages are crawled, but before the images are downloaded; thus, image content features are not available in this stage.

The following categories of features are utilized in the detection algorithm: a URL pattern feature, a page content feature, an aggregated feature, click log features, file extension type, and site modeling score.

With respect to URL pattern features 304, the following URL pattern features 304 are extracted from both the image URL and the image page URL. The depth is the minimum number of times a click must be made from the root webpage (displayed when only the domain is in the URL, and has a depth of zero) in order to get to a specific webpage.

HostDepth: The depth of URL host.
NumQueryParams: Number of query parameters.
PathDepth: URL path depth.
NumGenericSegs: Number of generic segments.
UrlLength: URL length.
HostLength: Host length.
IsDefaultPort: Binary indicator to indicate if a default port.
IsDefaultProtocol: Binary indicator to indicate if a default protocol.
IsDomainHomePage: Binary indicator to indicate if a domain home page.
IsIPHost: Binary indicator to indicate if an IP (Internet protocol) host.
IsHostHomePage: Binary indicator to indicate if a host home page.

The page content features 306 comprise the following:
StaticRank: Static rank of page.
DomainRank: Static rank of domain.
DisplayXDim: The display X dimension in the page.
DisplayYDim: The display Y dimension in the page.
DupCount: The duplication count of the image URL in its parent page.

IsDominant: Binary indicator to indicate if a dominant image in the page.

With respect to the aggregated features 308, the following features are extracted which contain aggregated information from the whole repository.

PageDupCnt: In how many pages the image URL appears.
PageDupCnt_PHost: In how many pages in one page host the image URL appears.
PageDupCnt_PDomain: In how many pages in one page domain the image URL appears.

With respect to click logs 310, the following features are extracted from toolbar (Tb) and browser (Br) logs:

| | |
|---|---|
| TbUrlHits | The number of hits via the toolbar URL. |
| TbUrlUsers | The number of toolbar URL users. |
| TbDomainUsers | The number of toolbar domain users. |
| TbViewCount | The number of counts via the toolbar view. |
| TbWidth | The toolbar width. |
| TbHeight | The toolbar height. |
| BrViewCount | The browser view count. |
| BrWidth | The browser image width. |
| BrHeight | The browser image height. |

With respect to file extension types 312,
JunkRate_FileExt: Probability of junk images for certain file extension types.
By analyzing the junk probability of all image URLs in the repository, a probability table can be created that considers, for example, file types such as gif, jpeg, jpg, other, php, and png.

With respect to site modeling, the site modeling feature 314 is based on the assumption that URLs from top hosts have different patterns for different kinds of URLs. For example, webmasters may typically organize the large images in one folder and small images in another folder. The site modeling feature 314 automatically learns the patterns within a host and estimates the junk/clicked images distribution for each pattern.

Figure 4:
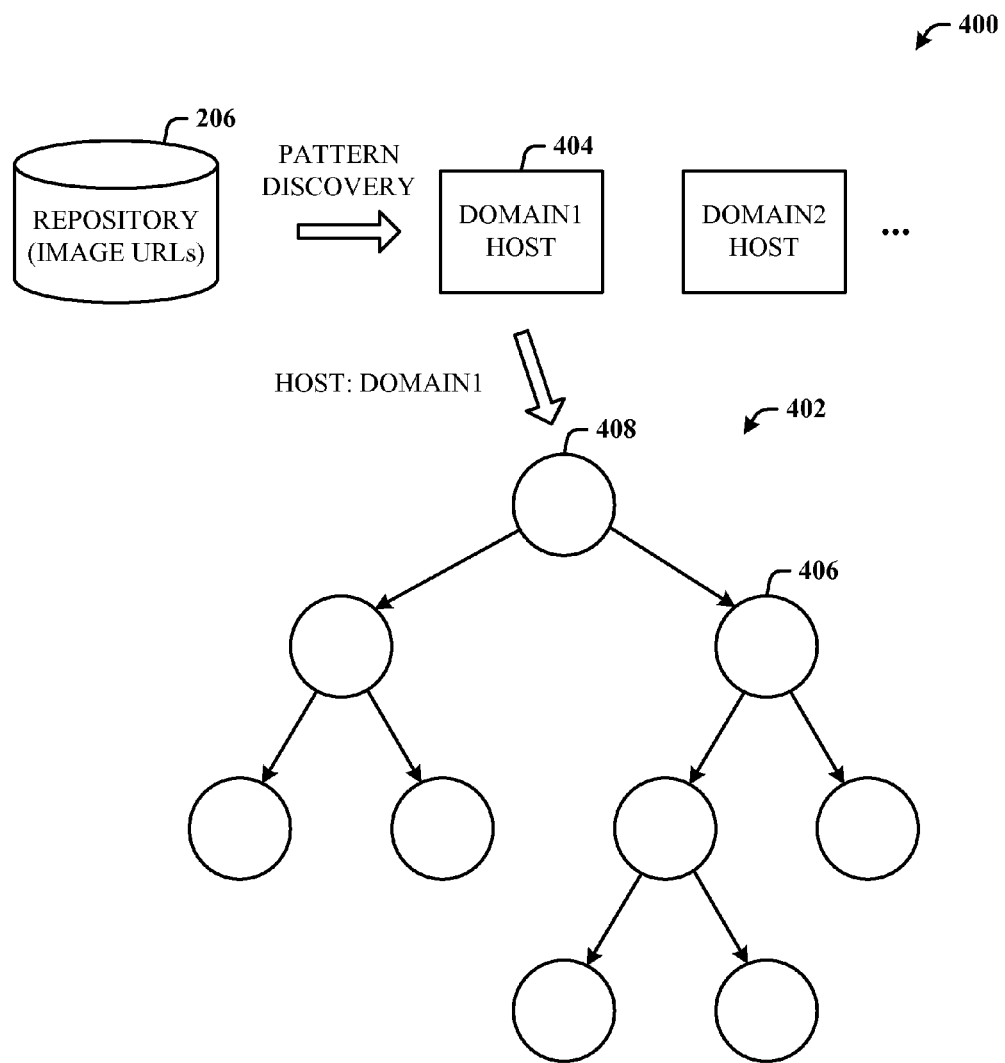
FIG. 4 illustrates a diagram for the creation of a pattern tree.

FIG. 4 illustrates a diagram 400 for the creation of a pattern tree 402. Site modeling involves building the pattern tree 402. The URLs from top hosts are sampled from the repository 206 and a pattern discovery algorithm builds the URL pattern tree 402. Here, the pattern tree 402 is shown for a first domain host 404. In the tree 402, the pattern of a child node is covered by its parent node (e.g., a child node 406 to its parent node 408). In this implementation, each node of the tree 402 can represent a regular expression.

Figure 5:
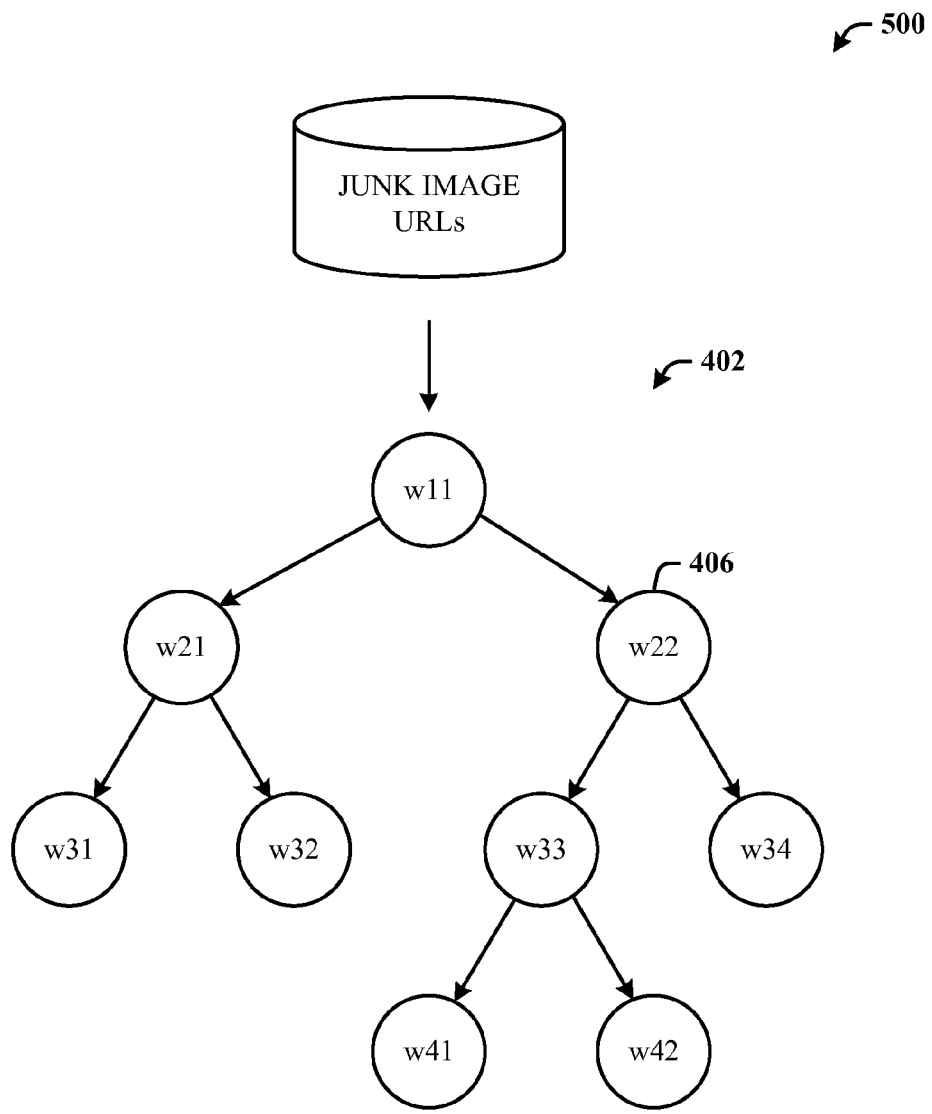
FIG. 5 illustrates a diagram for estimating junk image distributions of the nodes.

FIG. 5 illustrates a diagram 500 for estimating junk image distributions of the nodes. With respect to estimating junk (unwanted) image distributions, the labeled (e.g., junk or clicked) image URLs are passed to the URL pattern tree 402 and the junk/clicked image URL distributions are estimated for each node (e.g., node 406). The distribution ("weight (w)") of a node is defined as the percentage (or ratio) of junk/clicked image URLs for that node.

Figure 6:
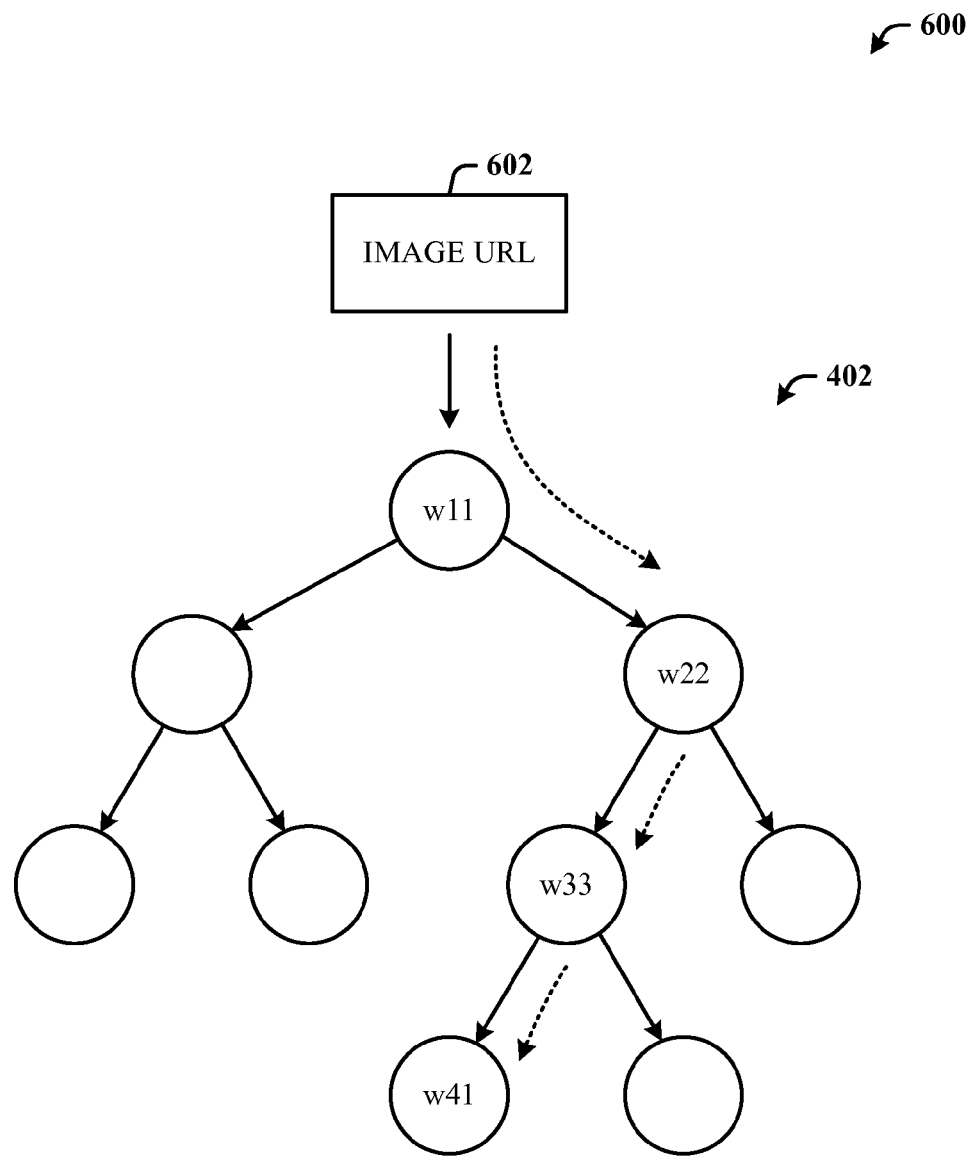
FIG. 6 illustrates a diagram for site model score prediction.

FIG. 6 illustrates a diagram 600 for site model score prediction. Score prediction is decay based on the depths. In the prediction stage, given an unseen URL 602, the unseen URL 602 is passed into the URL pattern tree 402 and its trace from root to leaf is obtained. The site modeling score of this URL is then defined as the weighted ($0.5^{depth}$) summation of all the node distributions ("weights") in its trace.

For example, in the trace represented by the doted arrows, the score is as follows:

$$score = w41 + w33*0.5 + w22*0.25 + w11*0.125$$

In one implementation, the following four site modeling features are employed in the junk detection algorithm:

SM_Score_MUrl: Distribution estimated by junk MUrls.

SM_Click_Score_MUrl: Distribution estimated by clicked MUrls.

SM_Score_PUrl: Distribution estimated by junk PUrls.

SM_Click_Score_PUrl: Distribution estimated by clicked PUrls.

where MUrls are image URLs and PUrls are URLs of the image parent page.

With respect to selection model training, the labeling of each image URL is computed according to the crawl status (in the repository).

There are two types of models to be trained for image URL selection: site modeling models (SM_Score_MUrl, SM_Click_Score_MUrl, SM_Score_PUrl, SM_Click_Score_PUrl), and the MART model. Projects can be created to enable semi-automatic model training and evaluation.

Figure 7:
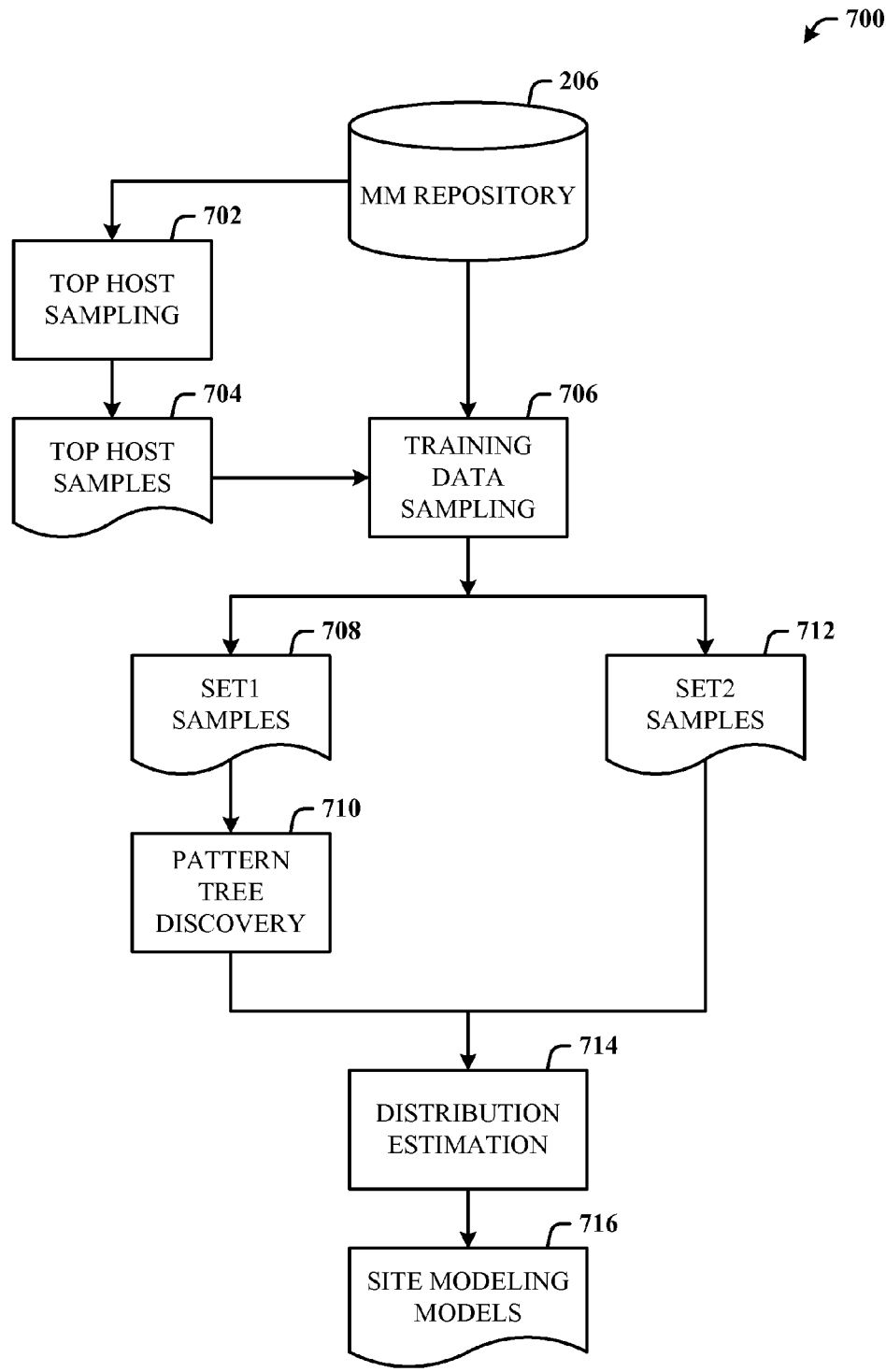
FIG. 7 illustrates a flow diagram for site modeling.

FIG. 7 illustrates a flow diagram 700 for site modeling. Site modeling can be trained according to the following steps. At 702, top host sampling is performed on the repository to obtain top host samples 704. The top host samples 704 are used as training data to be sampled, at 706, in combination with data from the repository 206. For each top host, URLs (MURLs/PURLs) are sampled from the repository as "Set1" training samples 708. The "Set1" training samples 708 are used to discover pattern trees, at 710. For each top host, "Junk MURLs"/"Junk PURLs"/"Clicked MURLs"/"Clicked PURLs" are sampled as "Set2" training samples 712. The "Set2" training samples 712 are used for distribution estimation, at 714, in the pattern trees for site modeling models 716.

With respect to MART model training, given all the required features, MART is utilized to train a junk image URL classification model. The training steps can include: sampling junk/non-junk nodules from the repository, splitting the data into training, validation, and test sets for model learning, extracting multimedia URL selection features for these nodules, and applying a MART model learning algorithm to learn the model. It is to be understood that the use of MART is simply one implementation; other algorithms can be employed, such as Fast Rank™.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
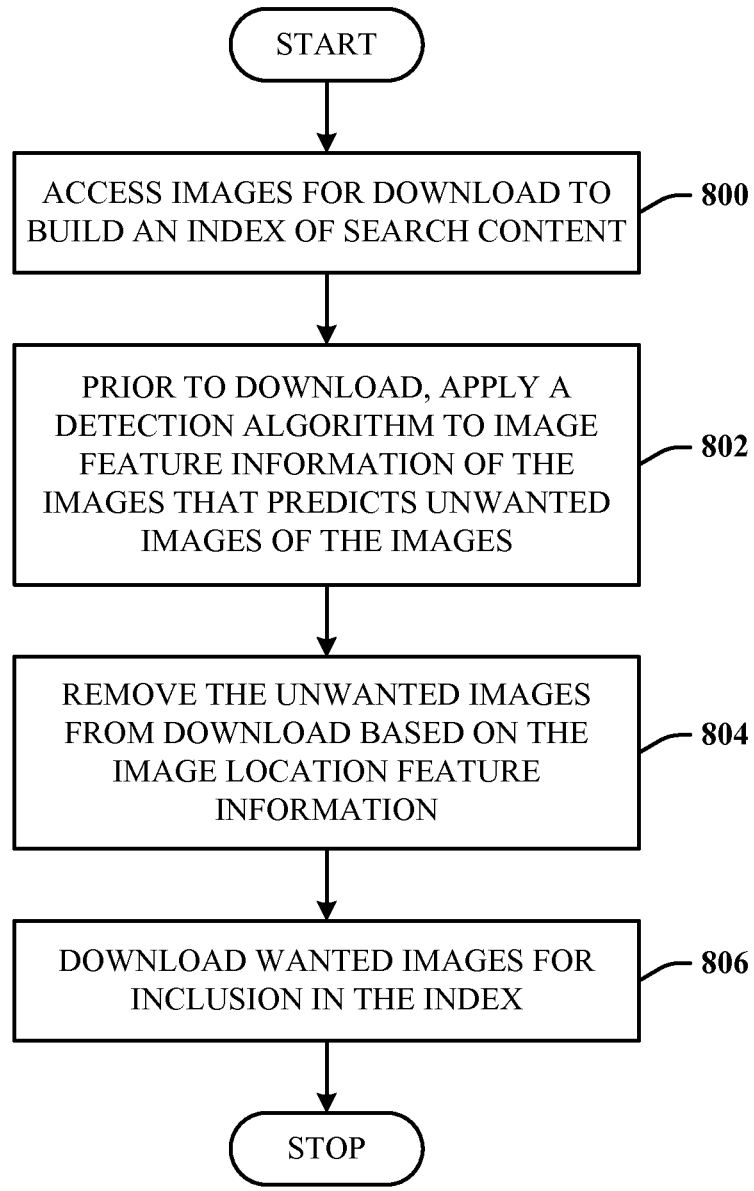
FIG. 8 illustrates a method in accordance with the disclosed architecture.

FIG. 8 illustrates a method in accordance with the disclosed architecture. At 800, images are accessed for download to build an index of search content. At 802, prior to download, a detection algorithm is applied to image feature information (e.g., URL pattern features, page content features, click log features, etc.) of the images that predicts unwanted (junk) images of the images. At 804, the unwanted images are removed from download based on the image location feature information. At 806, wanted images are downloaded for inclusion in the index.

The method can further comprise extracting image feature information related to at least one of image URL pattern features, image page content features, or image search log features, as part of a training stage. The method can further comprise extracting image feature information related to aggregated information features from a multimedia repository. The method can further comprise computing a probability that the unwanted images are of a specific file extension type.

The method can further comprise computing a website model feature that learns image patterns of a website and estimates a distribution for each image pattern. The method can further comprise training an unwanted image selection model based on sets of training images, validation images, and test images. The method can further comprise detecting the unwanted images after image pages are crawled but before the download.

Figure 9:
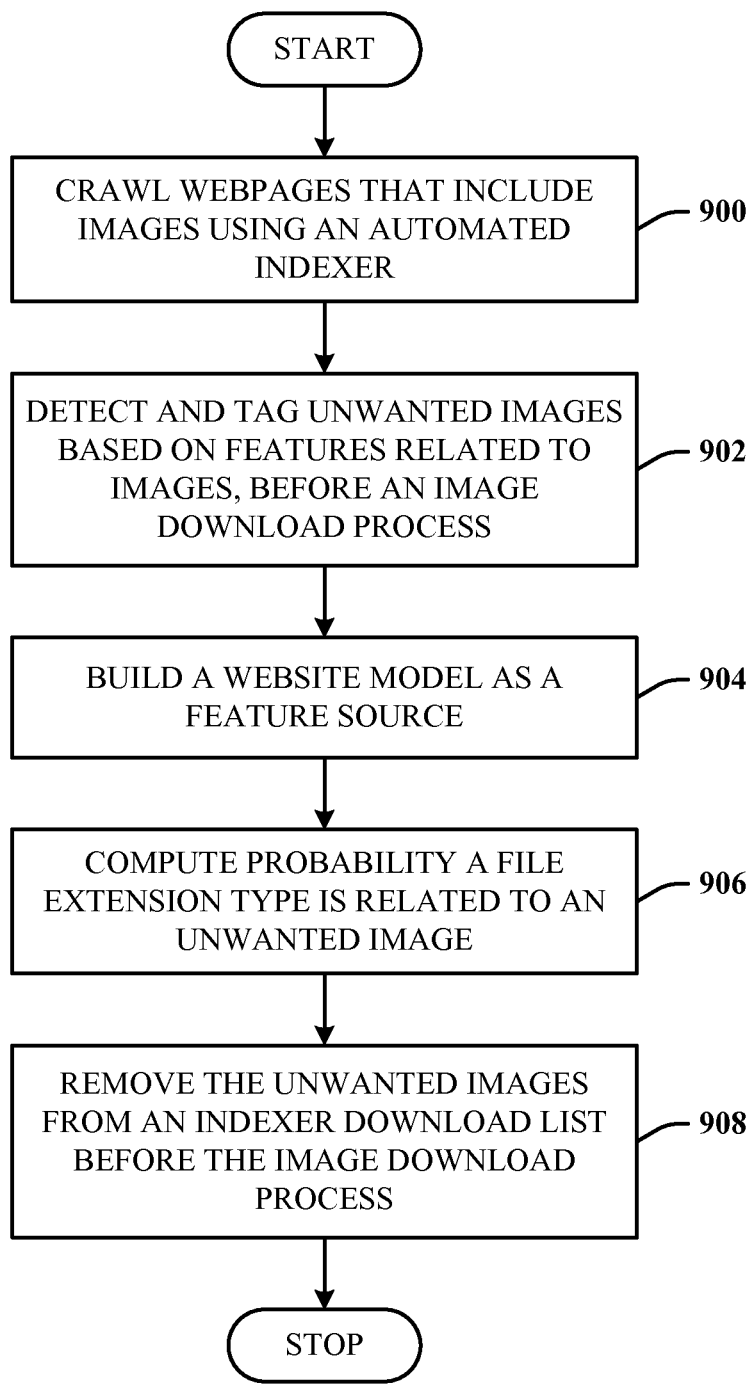
FIG. 9 illustrates an alternative method in accordance with the disclosed architecture.

FIG. 9 illustrates an alternative method in accordance with the disclosed architecture. At 900, webpages are crawled that include images using an automated indexer. At 902, unwanted images are detected and tagged based on features related to images, before an image download process. At 904, a website model is built as a feature source. At 906, probability a file extension type is computed is related to an unwanted image. At 908, the unwanted images are removed from an indexer download list before the image download process.

The method can further comprise an act of extracting features related to at least one of image location pointer pattern, image webpage content, or image search log. The method can further comprise an act of building the website model based on location descriptor pattern discovery of the website, unwanted image distribution of the website, and a website modeling score for a given location descriptor. The method can further comprise an act of extracting features related to appearance of an image location descriptor on pages, a host website, and a domain. The method can further comprise an act of training a selection model based on the features related to images, the website model, and file extension type.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
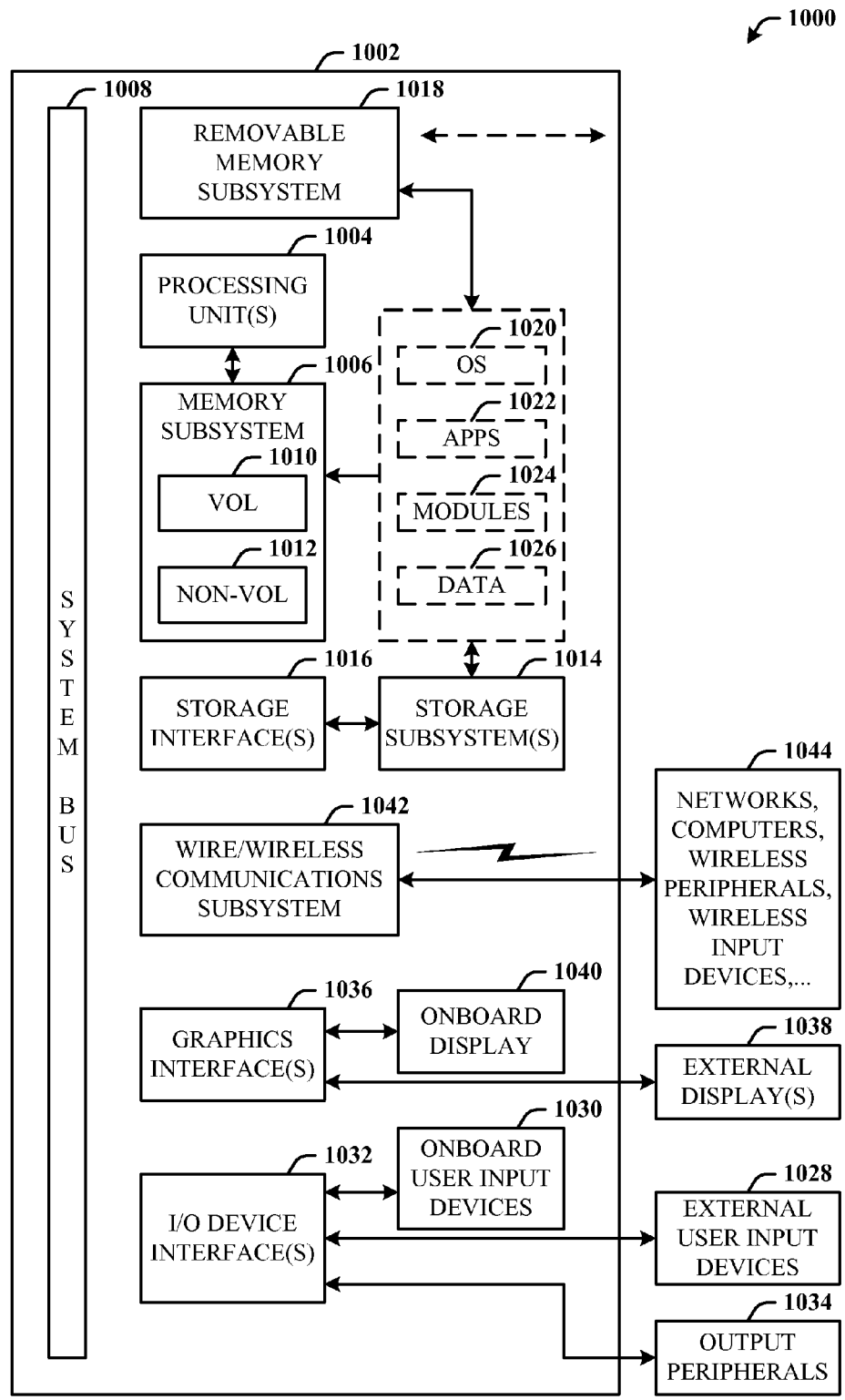
FIG. 10 illustrates a block diagram of a computing system that executes image URL-based junk detection in accordance with the disclosed architecture.

Referring now to FIG. 10, there is illustrated a block diagram of a computing system 1000 that executes image URL-based junk detection in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004 (also referred to as microprocessor(s) and processor(s)), a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1002 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include entities and components of the system 100 of FIG. 1, entities and components of the system 200 of FIG. 2, features of the system 300 of FIG. 3, entities and flow of the diagram 400 of FIG. 4, entities and flow of the diagram 500 of FIG. 5, entities and flow of the diagram 600 of FIG. 6, entities and flow of the diagram 700 of FIG. 7, and the methods represented by the flowcharts of FIGS. 8 and 9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 1002, and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse, as well as by voice commands facilitated by speech recognition. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example.

These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   an image filtering component configured to detect and remove unwanted images from an indexer download work list as part of indexing search content, the unwanted images detected based on a detection algorithm that predicts that an image is unwanted based on image feature information that comprises a probability a given unwanted image is of a file extension type; and
   a microprocessor configured to execute computer-executable instructions associated with the image filtering component.

2. The system of claim 1, wherein the unwanted images are detected based on a selection model trained using image feature information that includes image URL (uniform resource locator) patterns, image page content, and image search click logs.

3. The system of claim 1, wherein the unwanted images are removed from download based on removal from a work list of an automated indexer, the removal saves indexer bandwidth and improves an index publish rate.

4. The system of claim 1, wherein the image filtering component involves a training stage that learns a statistical selection model based on image feature information derived from image URLs and image page URLs.

5. The system of claim 1, wherein the image filtering component involves a training stage that learns a statistical selection model based on image feature information related to an aggregation feature derived from a multimedia repository.

6. The system of claim 1, wherein the image filtering component involves a training stage that learns a statistical selection model based on image feature information of specific file extension types.

7. The system of claim 1, wherein the image filtering component involves a training stage that learns a statistical selection model based on image feature information related to a site modeling feature computed from URL patterns learned within a host and estimate image distribution for the host.

8. The system of claim 1, wherein the image filtering component includes a machine learning component that builds a statistical unwanted image selection model to predict scores for the unwanted images.

9. A method, performed by a computer system executing machine-readable instructions, the method comprising acts of:
   accessing images for download to build an index of search content;
   prior to download, applying a detection algorithm to image feature information of the images that predicts unwanted images of the images;
   computing a probability that the unwanted images are of a specific file extension type;
   removing the unwanted images from an indexer download work list based on the image location feature information, such that removal saves indexer bandwidth and improves an index publish rate; and
   downloading wanted images for inclusion in the index.

10. The method of claim 9, further comprising extracting image feature information related to at least one of image URL (uniform resource locator) pattern features, image page content features, or image search log features, as part of a training stage.

11. The method of claim 9, further comprising extracting image feature information related to aggregated information features from a multimedia repository.

12. The method of claim 9, further comprising computing a website model feature that learns image patterns of a website and estimates a distribution for each image pattern.

13. The method of claim 9, further comprising training an unwanted image selection model based on sets of training images, validation images, and test images.

14. The method of claim 9, further comprising detecting the unwanted images after image pages are crawled but before the download.

15. The method of claim 9, further comprising employing categories of features in the detection algorithm that comprise at least one of a URL pattern feature, a page content feature, an aggregated feature, a click log feature, a file extension type, or a site modeling score.

16. A method performed by a computer system executing machine-readable instructions, the method comprising acts of:
   crawling webpages that include images using an automated indexer;
   detecting and tagging unwanted images based on features related to images, before an image download process;
   building a website model as a feature source;
   computing probability a file extension type is related to an unwanted image; and
   removing the unwanted images from an indexer download list before the image download process.

17. The method of claim 16, further comprising an act of extracting features related to at least one of image location pointer pattern, image webpage content, or image search log.

18. The method of claim 16, further comprising an act of building the website model based on location descriptor pattern discovery of the website, unwanted image distribution of the website, and a website modeling score for a given location descriptor.

19. The method of claim 16, further comprising an act of extracting features related to appearance of an image location descriptor on pages, a host website, and a domain.

20. The method of claim 16, further comprising an act of training a selection model based on the features related to images, the website model, and file extension type.

\* \* \* \* \*